E. P. & J. E. DAVIS & J. J. FISK.
MACHINE FOR PRESSING CORN-STALKS, &c., FOR FUEL.

No. 191,571. Patented June 5, 1877.

UNITED STATES PATENT OFFICE.

EDGAR P. DAVIS, JAMES E. DAVIS, AND JOHN J. FISK, OF CRETE, NEBR.

IMPROVEMENT IN MACHINES FOR PRESSING CORN-STALKS, &c., FOR FUEL.

Specification forming part of Letters Patent No. 191,571, dated June 5, 1877; application filed April 23, 1877.

*To all whom it may concern:*

Figure 1:
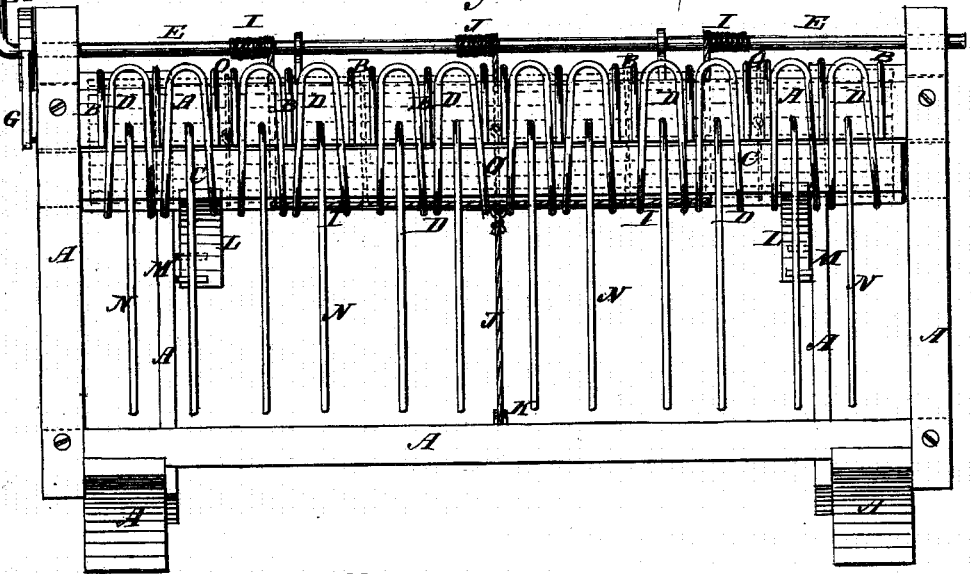
Figure 2:
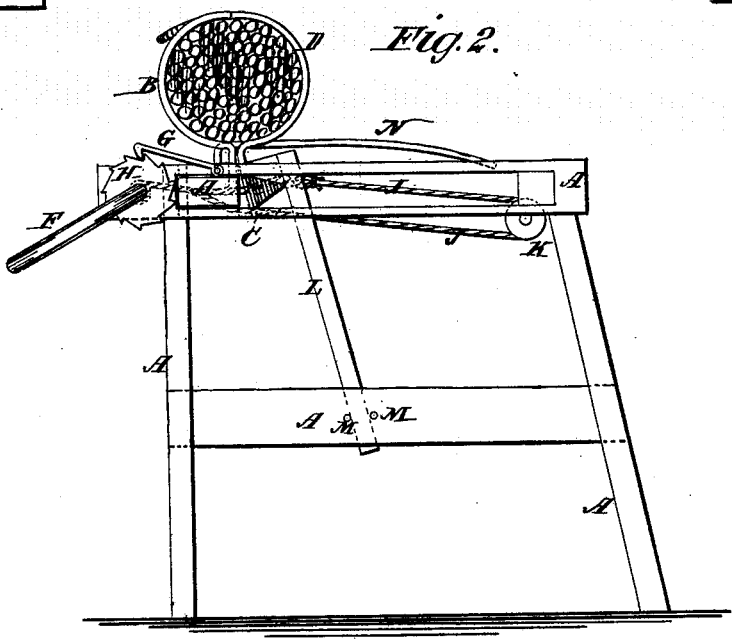
Figure 3:
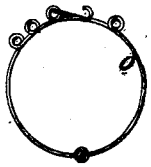

Be it known that we, EDGAR PULASKI DAVIS, JAMES EATON DAVIS, and JOHN J. FISK, of Crete, in the county of Saline and State of Nebraska, have invented a new and useful Improvement in Machine for Pressing Corn-Stalks, &c., for Fuel, of which the following is a specification:

Figure 1 is a top view of our improved machine. Fig. 2 is a side view of the same. Fig. 3 is a detail view of one of the bands.

Similar letters of reference indicate corresponding parts.

The object of this invention is to furnish an improved machine for pressing corn-stalks, hay, weeds, and other light material into bundles for fuel, which shall be simple in construction, convenient in use, and effective in operation, enabling the material to be easily and quickly pressed into compact bundles.

The invention will first be described in connection with the drawing, and then pointed out in claim.

A represents the frame of the machine, which is made of a convenient height and size, and to the front top bar of which are attached semicircular arms B.

The arms B may be made of wrought or cast iron, and should be strengthened with braces. The top side bars of the frame A are slotted longitudinally to receive the ends of the sliding bar C.

To the sliding bar C are attached semicircular arms D, which may be made of wrought or cast iron, and should be strengthened with braces. The arms D may be made wider than the arms B, and are so arranged as to enter the spaces between the arms B, except at the places where the bands are to be put around the bundles, and where the long bundle is to be sawed into lengths or sections. At these points two of the arms B or of the arms D should be without any intervening arm.

To the forward ends of the side bars of the frame A is pivoted a shaft, E, to one end of which is attached a crank, F. The shaft E is held in position to hold the bundles compressed while the bands are being put around them, and while they are being sawed into lengths, by a pawl, G, pivoted to the frame A, and which engages with a ratchet-wheel, H, attached to the shaft E.

To the shaft E are attached two ropes, I, the other ends of which are attached to the sliding bar C, so that the said bar C may be drawn forward to compress the material by turning the crank F. If desired, the ropes I may be made in one piece, passing along the forward side of the sliding bar C, passing through holes in the end parts of the said bar C, and having their ends attached to the shaft E.

The latter arrangement we prefer, as it enables the sliding bar C to adjust itself into an inclined position should the material be thicker toward one end of the machine than toward the other, so as to press a tapering bundle.

To the shaft E is attached the end of a rope, J, which is wound around said shaft in the opposite direction from the ropes I, passes around a pulley, K, pivoted to the rear top bar of the frame A, and its other end is attached to the center of the sliding bar C. By this arrangement the bar C will be drawn forward to compress the material by turning the shaft E in one direction, and may be drawn back to release the bundles by turning the said shaft in the other direction.

To the sliding bar C are attached the upper ends of two levers, L, the lower ends of which are pivoted to the lower side bars of the frame A by fulcrum-pins M, or other convenient means. The effect of the levers L is to press the arms D down upon the top of the bundles, and thus make them more compact, the bundles being thus compressed by crank and lever power.

When the sliding bar C and its arms D have been drawn back, the material is laid upon the rods or arms N, the forward ends of which are attached to the front top bar of the frame A, and the rear ends of which may be left free, or may be attached to the rear top bar of the said frame A. When the material has been compressed the bands O are fastened around it in such positions as to be in the centers of the lengths or sections when sawed apart.

The bands O are each formed of two pieces of wire jointed to each other at one end and having hooks and eyes formed upon them at the other ends, several eyes being formed in the said wires so that the same band may be used for binding different-sized bundles. The eyes are formed in the band O by forming small coils in the wire, as shown in Fig. 3.

Having thus described our invention, we claim as new and desire to secure by Letters Patent—

The combination of the two sets of semicircular arms B D, the sliding bar C, the rods or arms N, the crank-shaft E F, and its pawl and ratchet G H, the ropes I and J, the pulley K, and the levers L, with each other, and with the frame A, substantially as herein shown and described.

EDGAR PULASKI DAVIS.
   JAMES EATON DAVIS.
   JOHN J. FISK.

Witnesses:
 C. A. CALDWELL,
 J. P. CLAREY.